United States Patent
McGee et al.

(10) Patent No.: US 7,460,470 B2
(45) Date of Patent: Dec. 2, 2008

(54) SYSTEMS AND METHODS OF PRIORITY FAILOVER DETERMINATION

(75) Inventors: Michael Sean McGee, Round Rock, TX (US); Mark R. Enstone, Austin, TX (US); Gregory T. Howard, Cedar Park, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 558 days.

(21) Appl. No.: 11/084,600

(22) Filed: Mar. 18, 2005

(65) Prior Publication Data

US 2006/0209677 A1  Sep. 21, 2006

(51) Int. Cl.
*G01R 31/08* (2006.01)

(52) U.S. Cl. .............. 370/218; 370/244; 370/248; 370/238

(58) Field of Classification Search .......... 370/401, 370/218, 242; 709/226, 220, 105
See application file for complete search history.

(56) References Cited

U.S. PATENT DOCUMENTS

| | | | | |
|---|---|---|---|---|
| 6,272,113 | B1 * | 8/2001 | McIntyre et al. | 370/248 |
| 6,393,483 | B1 * | 5/2002 | Latif et al. | 709/226 |
| 6,400,681 | B1 * | 6/2002 | Bertin et al. | 370/218 |
| 6,490,632 | B1 | 12/2002 | Vepa et al. | |
| 6,512,774 | B1 | 1/2003 | Vepa et al. | |
| 6,516,352 | B1 | 2/2003 | Booth et al. | |
| 6,560,630 | B1 * | 5/2003 | Vepa et al. | 718/105 |
| 6,567,377 | B1 | 5/2003 | Vepa et al. | |
| 6,590,861 | B1 | 7/2003 | Vepa et al. | |
| 2002/0072391 | A1 * | 6/2002 | Itoh et al. | 455/557 |
| 2003/0140124 | A1 * | 7/2003 | Burns | 709/220 |
| 2004/0024962 | A1 * | 2/2004 | Chatterjee et al. | 711/114 |
| 2004/0158651 | A1 * | 8/2004 | Fan et al. | 710/1 |
| 2005/0259632 | A1 * | 11/2005 | Malpani et al. | 370/351 |

OTHER PUBLICATIONS

Bhutani and Mahmood, "Using NIC Teaming to Achieve High Availability on Linus Platforms", Dell Power Solutions, Feb. 2003, Dell, Inc.
Mendhikar, "How to Configure NIC Teaming Drivers Using INETCFG", AppNotes, Oct. 2002, Novell, Inc.
Broadcom, "Broadcom NetXtreme(TM) Gigabit Ethernet Teaming", White Paper BCM570X, Jul. 9, 2003, Broadcom Corporation.
"hp ProLiant network adapter teaming", Technical White Paper, 2003, Hewlett-Packard Development Company, LP.

* cited by examiner

*Primary Examiner*—Ricky Ngo
*Assistant Examiner*—Dewanda Samuel

(57) ABSTRACT

Systems and methods or implementing priority failover determination are disclosed. An exemplary method includes prioritizing ranking criteria for plurality of network adapter ports based at least in part on user input. The method also includes determining a ranking value for each of the plurality of network adapter ports based on the prioritized ranking criteria. The method further includes designating a primary adapter port and at least a secondary network adapter port based on the ranking value for each of the plurality of network adapter ports.

16 Claims, 7 Drawing Sheets

| 400 | Status (0,1) | Echo Node (0,1) | Path Cost (12 bytes/ 96 bits) | ... | Preferred (0-7) | Member ID (0-7) | Ranking Value 440 | Rank 450 |
|---|---|---|---|---|---|---|---|---|
| N1 | 0 _430a_ | 0 _431a_ | 12 _432a_ | ... | 1 _433a_ | 3 _434a_ | 001213 _445a_ | 1 _455a_ |
| N2 | 1 _430b_ | 1 _431b_ | 12 _432b_ | ... | 1 _433b_ | 1 _434b_ | 111211 _445b_ | 3 _455b_ |
| N3 | 0 _430c_ | 0 _431c_ | 27 _432c_ | ... | 2 _433c_ | 2 _434c_ | 002722 _445c_ | 2 _455c_ |

| 500 | Status (0,1) | Path Cost (12 bytes/ 96 bits) | Echo Node (0,1) | ... | Preferred (0-7) | Member ID (0-7) | Ranking Value 540 | Rank 550 |
|---|---|---|---|---|---|---|---|---|
| N1 | 0 _530a_ | 12 _531a_ | 0 _532a_ | ... | 1 _533a_ | 3 _534a_ | 012013 _545a_ | 1 _555a_ |
| N2 | 1 _530b_ | 12 _531b_ | 1 _532b_ | ... | 1 _533b_ | 1 _534b_ | 012111 _545b_ | 2 _555b_ |
| N3 | 0 _530c_ | 27 _531c_ | 0 _532c_ | ... | 2 _533c_ | 2 _534c_ | 027022 _545c_ | 3 _555c_ |

SYSTEMS AND METHODS OF PRIORITY FAILOVER DETERMINATION

TECHNICAL FIELD

The described subject matter relates to computer networks, and more particularly to systems and methods of priority failover determination.

BACKGROUND

Network adapters, also referred to as network interface cards (NICs), are readily commercially available to support any of a wide variety of network topologies. One or more network adapters may be implemented in a configuration known as "teaming" to provide a plurality of ports (also referred to as "team members") logically coupled in parallel to appear as a single virtual network adapter. Although teaming is not limited to use in servers, teaming is particularly common in servers to support the demand for high throughput (i.e., load balancing) and resource redundancy to increase reliability (i.e., fault tolerance).

Fault tolerant teaming typically implements multiple ports, wherein one port is "active" and designated as "primary" while the other ports are designated as "secondary" and are placed in a "standby" mode. A secondary port remains largely idle until activated to replace a failed primary port. Accordingly, the network connection is not interrupted when a port fails.

Load balancing teaming typically combines multiple ports to increase the aggregate throughput of data traffic. The port designated as "primary" typically handles all of the data received by the team, but various algorithms may be employed to balance network traffic across one or more "secondary" ports to meet increasing throughput demand (e.g., where one port would have otherwise reached its maximum throughput). Load-balancing teaming inherently provides fault tolerance, but most commonly at a lower aggregate throughput than the fully functional team.

The process of assigning a primary team member is typically by default (e.g., the port occupying the lowest numbered slot is designated as primary and all other ports are designated as secondary). More sophisticated teaming allows the user or installation technician to designate the primary team member, e.g., based on the lowest cost path at the time of installation.

SUMMARY

An exemplary implementation of priority failover determination in a teaming environment may be implemented as a system. The system may comprise a computing device having a plurality of team members coupled to a computer network, a user interface for prioritizing ranking criteria for the plurality of team members, and a controller operatively associated with the user interface and the plurality of team members. The controller may include program code for determining a ranking value for each of the plurality of team members based on the prioritized ranking criteria. The controller may also include program code for designating a primary team member and at least a secondary team member based on the ranking value for each of the plurality of team members.

In another exemplary implementation, priority failover determination may be implemented as a method, comprising: prioritizing ranking criteria for a plurality of network adapter ports based at least in part on user input, determining a ranking value for each of the plurality of network adapter ports based on the prioritized ranking criteria, and designating a primary network adapter port and at least a secondary network adapter port based on the ranking value for each of the plurality of network adapter ports.

BRIEF DESCRIPTION OF THE DRAWINGS

FIGS. 4 and 5 are high-level illustrations of exemplary priority failover determination.

DETAILED DESCRIPTION

Briefly, systems and methods of priority failover determination may be implemented in a teaming environment as computer readable program code executable on a computing device (e.g., a network server). A graphical user interface (GUI) may be provided to facilitate user input.

Exemplary embodiments of priority failover determination enable a user to prioritize a plurality of failover criteria which may be used to designate primary and secondary (or failover) network adapter ports (or NICs) in a teaming environment. Exemplary embodiments of priority failover determination may dynamically configure network adapters based on the relative importance of various failover criteria to different users, changing network conditions, and/or the addition of more advanced failover criteria.

It is noted that operations described herein may be embodied as logic instructions on a computer-readable medium. When executed on a processor, the logic instructions cause a general purpose computing device to be programmed as a special-purpose machine that implements the described operations.

Exemplary System

Figure 1:
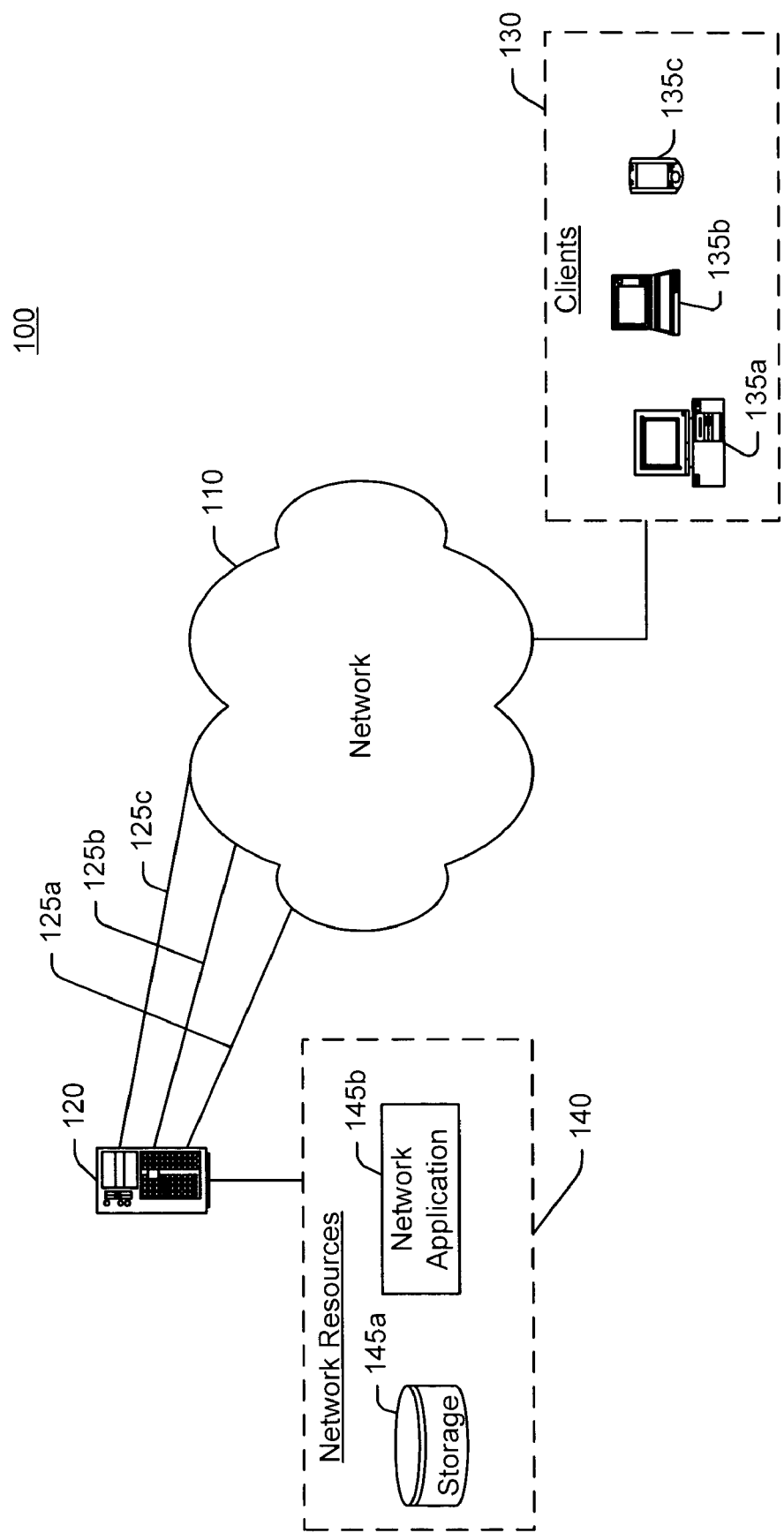
FIG. 1 is a schematic diagram of an exemplary network in which priority failover determination may be implemented.

FIG. 1 is a schematic diagram of an exemplary network in which priority failover determination may be implemented. Networked computer system 100 may include one or more communication networks 110, such as a local area network (LAN) and/or wide area network (WAN). A host 120 may be implemented in the networked computer system 100 to provide a plurality of network paths 125-*a-c* for clients 130 to access any of a wide variety of network resources 140. Exemplary network resources may include, but are not limited to, network storage 145*a*, network applications 145*b*, Internet and email services, etc.

As used herein, the term "host" includes one or more computing device and software (i.e., the entire system) that provide services to other computing or data processing systems or devices. For example, clients 130 may access network resources 140 via host 120. Host 120 may include one or more processors (or processing units) and system memory, and is typically implemented as a server computer. Host 120 may execute a configuration application implemented in software to configure network adapters, as described in more detail below with reference to FIG. 3. Host 120 may also provide services to other computing or data processing systems or devices (e.g., transaction processing services).

As used herein, the term "client" refers to one or more computing systems including memory and a degree of data processing capability at least sufficient to manage a connection to the host 120. Typically, clients 110 are implemented as personal (or laptop) computers 135a, 135b, but may also include other network devices (e.g., wireless devices 135c), workstations, and even other server computers, to name only a few examples.

Before continuing, it is noted that networked computer system 100 is not limited to any particular type or physical configuration. For example, the number of network paths 125a-c may depend upon various design considerations. Such considerations may include, but are not limited to, the types of network resources 140 being accessed and the frequency with which the network resources 140 are accessed. Consequently, embodiments of priority failover determination in accordance with the invention are not to be regarded as being limited to use with any particular type or physical layout of networked computer system 100.

Figure 2:
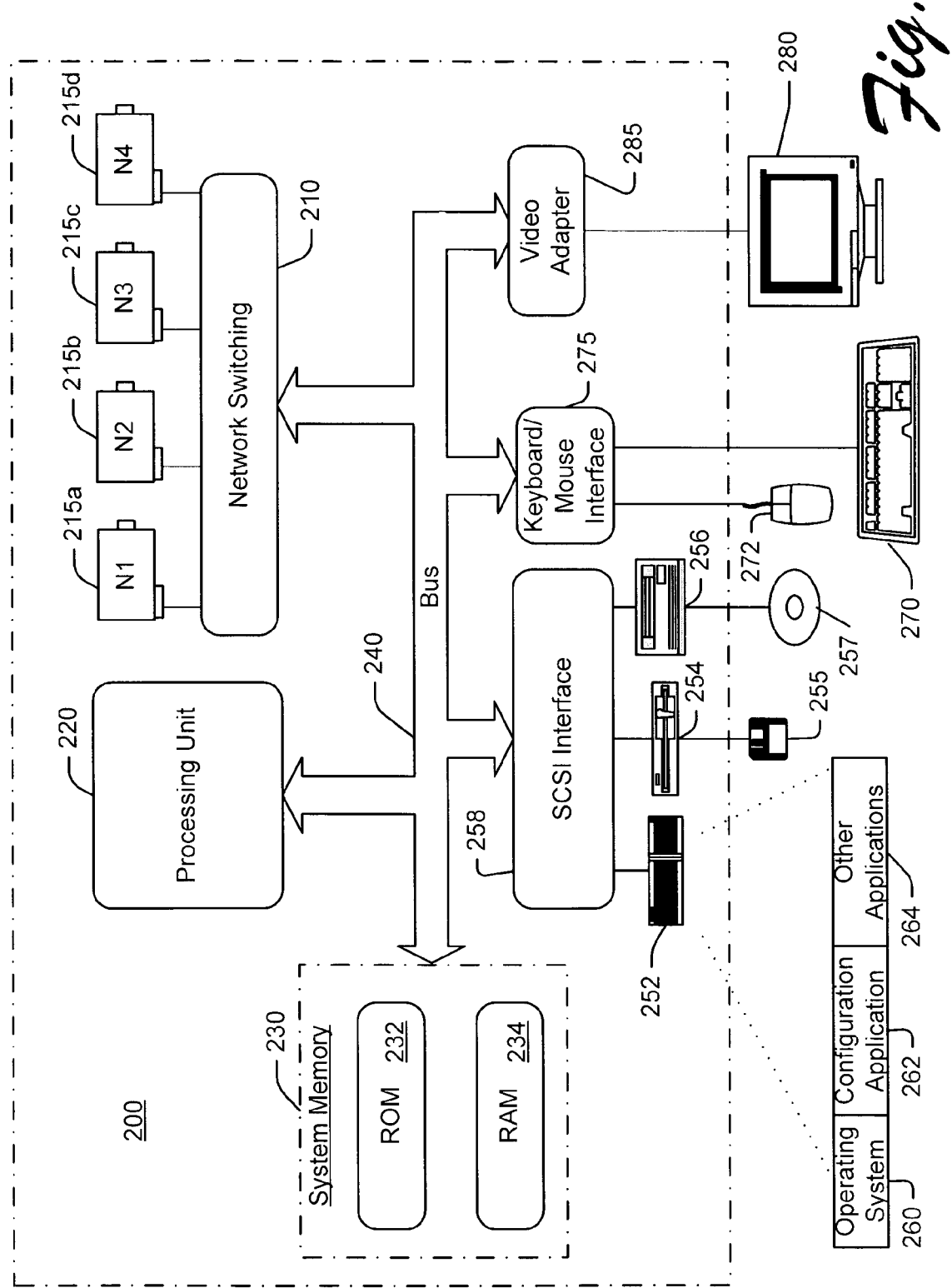
FIG. 2 is a schematic diagram of an exemplary computing device which may be coupled to a network to implement priority failover determination.

FIG. 2 is a schematic diagram of an exemplary computing device which may be coupled to a network to implement priority failover determination. In an exemplary embodiment, computing device 200 is implemented as a server computer (e.g., host 120 in FIG. 1), although other implementations are also contemplated.

Computing device 200 may operate in a networked environment using logical connections to one or more remote computers or other network resources (e.g., the network resources 140 in FIG. 1). Logical connections may be established in a LAN and/or a WAN, although it will be appreciated that these network connections are exemplary and other means of establishing a communications link between the computers may be used.

In an exemplary embodiment, computing device 200 may include a networking interface 210 having one or more network adapters 215a-d. It is noted that each of the network adapters may include one or more ports, each port for establishing a network path (e.g., network paths 125a-c in FIG. 1). Network adapters 215a-d may be implemented in a teaming environment wherein the network adapter ports are logically coupled in parallel to appear as a single virtual network adapter port. As mentioned above, the network adapter ports may be referred to as "team members" when implemented in a teaming environment.

Computing device 200 may also include one or more processor or processing units 220, a system memory 230, and a bus 240 that couples various components including the system memory 230 and network switching 210 to processor 220. The bus 240 represents one or more of any of several types of bus structures, including a memory bus or memory controller, a peripheral bus, and a processor or local bus using any of a variety of bus architectures. The system memory 230 may include, e.g., read only memory (ROM) 232 and random access memory (RAM) 234.

Computing device 200 further includes storage such as a hard disk drive 252 for reading from and writing to a hard disk (not shown), magnetic disk drive 254 for reading from and writing to a removable magnetic disk 255, and an optical disk drive 256 for reading from or writing to a removable optical disk 257 such as a CD, DVD or other optical media. The storage is connected to the bus 240, e.g., by a small computer system interface (SCSI) interface 258 or other appropriate interface. The drives and their associated computer-readable media provide nonvolatile storage of computer-readable instructions, data structures, program modules and other data for computing device 200. It is noted that other types of computer-readable media such as magnetic cassettes, flash memory cards, digital video disks, random access memories (RAMs), read only memories (ROMs), and the like, may also be used in the exemplary operating environment.

A user may enter commands and information into computing device 200 through input devices such as, e.g., a keyboard 270 and a pointing device 272. Other input devices may also be implemented. The input devices are connected to the processing unit 220 through an interface 275 that is coupled to the bus 240. A monitor 280 or other type of display device may also be connected to the bus 240 via an interface, such as a video adapter 285.

A number of program modules may be stored in memory, including an operating system 260, a configuration application 262 for implementing priority failover determination, and one or more other application programs or program modules 264. In a networked environment, program modules or portions thereof may also be stored in a remote storage device.

Generally, the data processors of computing device 200 are programmed by means of instructions stored at different times in the various computer-readable storage media of the computer. Programs and operating systems may distributed, for example, on floppy disks, CD-ROMs, or electronically, and are installed or loaded into the secondary memory of a computer. At execution, the programs are loaded at least partially into the computer's primary electronic memory.

Figure 3:
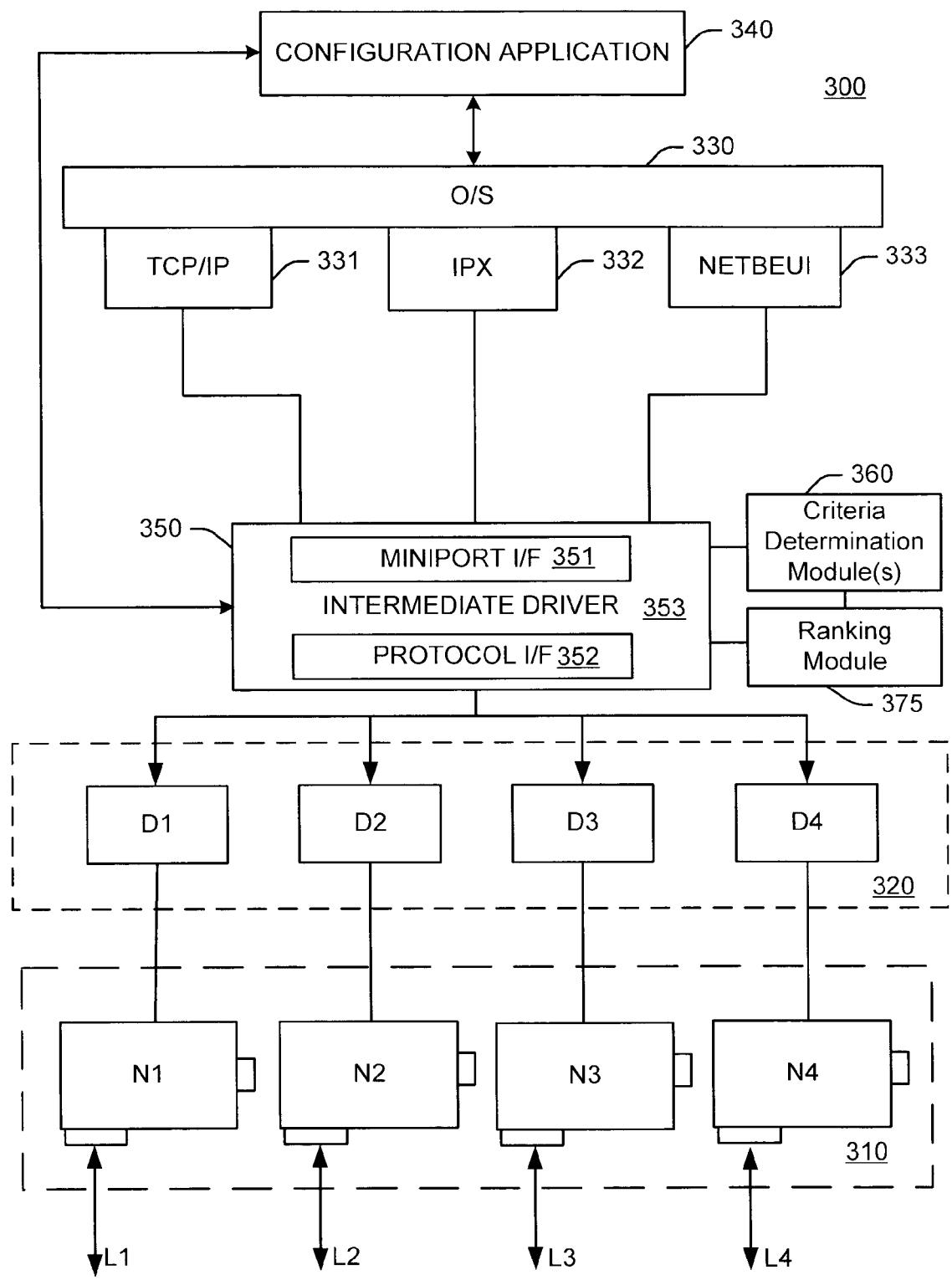
FIG. 3 is a functional block diagram of an exemplary controller that may be installed on a computing device to implement priority failover determination.

FIG. 3 is a functional block diagram of an exemplary controller that may be installed on a computer system (e.g., computing device 200 in FIG. 2) to implement priority failover determination in a teaming environment. Controller 300 may be implemented in computer-readable program code executable by one or more computing systems coupled to a network. For example, controller 300 may be implemented as software residing on the server 120 in FIG. 1.

For purposes of illustration, controller 300 is configured to handle four network adapters 310 (i.e., N1, N2, N3, and N4) and instantiations of their drivers 320 (i.e., D1, D2, D3 and D4). Each instantiation of a driver 320 controls the single-port network adapters 310. Drivers 320 may be instances of the same driver if network adapters 310 are the same network adapter (e.g., having multiple ports), or they may be different drivers if any of their corresponding network adapters 310 are separate network adapters.

An operating system (O/S) 330 that supports networking (e.g., Microsoft WINDOWS® or other suitable operating system) is provided to support one or more communication protocols, such as, e.g., TCP/IP 331, IPX (Internet Protocol eXchange) 332, NetBEUI (NETwork BIOS End User Interface) 333, etc. A configuration application 340 program runs in conjunction with O/S 330.

An embodiment of configuration application 340 provides a graphical user interface (e.g., GUI 600 in FIG. 6) through which users may program configuration information for teaming of the network adapters. For example, users may provide input for prioritizing ranking criteria for use in priority failover determination. Additionally, the configuration application 340 receives assessed configuration information for the network adapters 310 from the teaming driver 350 that can be displayed to the user in the GUI, including the status of the resources for its team (e.g. "failed," "standby" and/or "active"), and the designation of each network adapter as primary, secondary, etc. Configuration application 340 also provides commands by which resources can be allocated to teams and reconfigured.

A hierarchy of layers within the O/S 330, each performing a distinct function and passing information between one another, enables communication with an operating system of another network device over the network. For example, at least four such layers have been added to the Microsoft WINDOWS® operating system: the Miniport I/F Layer 351, the Protocol I/F Layer 352, the Intermediate Driver Layer 353 and the Network Driver Interface Specification (NDIS) (not shown). The Protocol I/F Layer 352 is responsible for protocol addresses and for translating protocol addresses to MAC addresses. It also provides an interface between the protocol stacks 331, 332, 333 and the NDIS layer. The drivers for controlling each network adapter or network adapter ports reside at the Miniport I/F Layer 351 and are typically written and provided by the vendor of the network adapter hardware. The NDIS layer is provided with the Microsoft WINDOWS O/S to handle communications between the Miniport Driver Layer 351 and the Protocol I/F Layer 352.

Briefly, teaming of a plurality of network adapters may be accomplished as follows. An instance of an intermediate driver residing at the Intermediate Driver Layer 353 is interposed between the Miniport Driver Layer 351 and the NDIS. Although the Intermediate Driver Layer 353 does not control any hardware, it makes the group of miniport drivers for each of the network adapter ports to function seamlessly as one driver that interfaces with the NDIS layer. Thus, the intermediate driver makes the network adapter drivers of a team appear to be one network adapter driver controlling one network adapter port.

Before continuing, it is noted that exemplary controller 300 is shown and described herein for purposes of illustration and is not intended to be limiting. For example, the functional components shown in FIG. 3 do not need to be encapsulated as separate modules. In addition, other functional components may also be provided and are not limited to those shown and described herein.

Teaming is explained in more detail, e.g., in the technical white paper entitled "HP Proliant Network Adapter Teaming Technology," by Hewlett-Packard Development Company, LP (June, 2003), and is also well understood in the art. Therefore, further description of a controller for teaming is not required in order to fully understand and practice priority failover determination in a teaming environment.

A fault tolerant team may be employed where the throughput of a single network adapter port is sufficient but fault tolerance is important. As an example, the network adapter ports providing redundant network paths (or links) L1 through L4 may be configured as a network fault tolerance (NFT) team. For an NFT team, one of the links (e.g. link L1) is initially assigned as the primary and is also designated "active." The other links L2-L4 may all be designated as secondary links, or ranked for ordered failover (e.g., as secondary, tertiary, etc.).

Designating links L1-L4 as primary, secondary, etc., may be accomplished based at least in part on input provided by a user through the GUI of configuration application 340. One or more criteria determination modules 360 may be provided for a plurality of ranking criterion (e.g., link state, receive-heartbeat failure, transmit-heartbeat failure, speed (or port cost), fast path cost, active path, user preference, Hot Standby Routing Protocol (HSRP), Virtual Router Redundancy Protocol (VRRP), and/or any other ranking criteria for network adapters now known or later implemented in a teaming environment.

In operation, criteria determination module(s) 360 may receive test input from the teaming driver for the network adapters 310. A ranking module 270 may be provided in association with the criteria determination module 360 to receive user input (e.g., from the GUI) prioritizing the ranking criteria, and establish a component score for each of the network adapters based on the prioritized ranking criteria. The ranking module 270 may use the component scores to determine a ranking value for the network adapters, and designate a network adapter (e.g., as primary, secondary, etc.) based on the corresponding ranking values, as explained in more detail below with reference to FIGS. 4-6.

FIG. 4 is a high-level illustration of exemplary priority failover determination. A matrix 400 is used in this illustration, wherein the column headings identify failover criteria 410, e.g., Status, Echo Node, Path Cost, Preferred, and Member ID. Rows headings identify network adapter ports 420 (N1-N3) in a team environment (such as the network adapters in FIG. 3).

It is noted that in practice the type and/or number of failover criteria and number of network adapters may be limited by practical considerations (e.g., connectivity of the teaming environment). However, there are few, if any, theoretical limits on the failover criteria and network adapters that may be implemented in a teaming environment.

Figure 6:
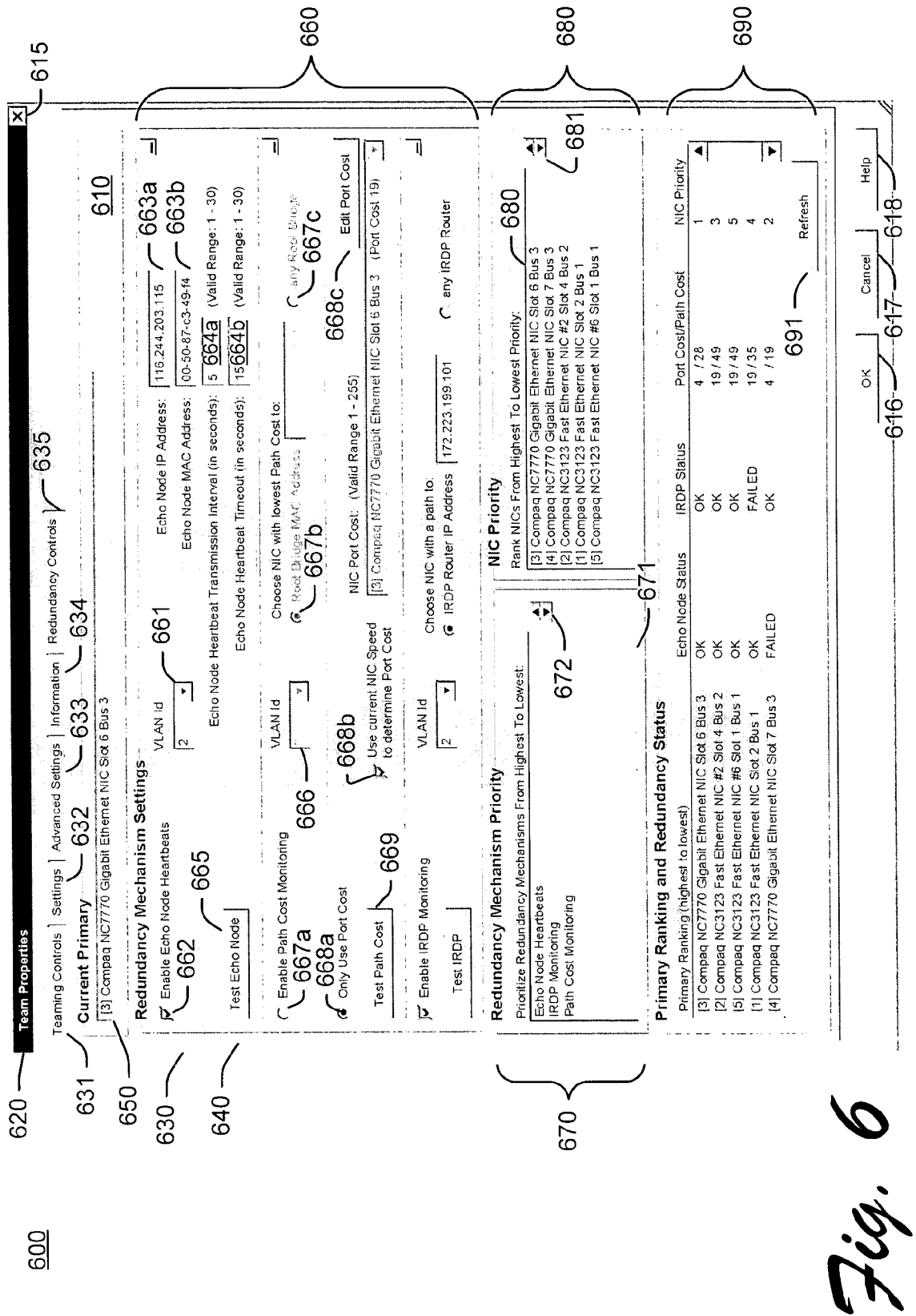
FIG. 6 is an exemplary user interface that may be implemented for priority failover determination.

The failover criteria 410 are prioritized at least in part by the user (e.g., using the GUI 600 in FIG. 6). That is, the failover criteria 410 may be prioritized based on the relative importance a user assigns each of the failover criteria 410 relative other failover criteria 410. It is noted that one or more failover criteria 410 may also be assigned a permanent or semi-permanent priority, e.g., by the manufacturer or installer.

The failover criteria 410 are shown from highest priority to lowest priority when moving from left to right across matrix 400. For purposes of this illustration, the user has assigned the following priority for designating network adapters in a teaming environment: 1) status, 2) echo node, and 3) path cost.

The user may also manually rank the network adapters 420. The preferred network adapter has a lower priority than the other failover criteria 410 and serves as a "tie-breaker" in the event two or more network adapters 420 are assigned the same priority during priority failover determination. It is noted, however, that a user may assign the same preference to two or more network adapters 420 (e.g., N1 and N3). Therefore, a member ID may also be implemented as an "ultimate tie-breaker" in the event that two or more network adapters 420 are assigned the same priority. The member ID is assigned by the manufacturer (or installation technician) and is not the same for any two or more network adapters 420.

Matrix 400 includes a plurality of cells 430a-c through 434a-c. Each of the cells 430a-c through 434a-c represents a component score for individual ranking criterion 410 corresponding to each network adapter 420. In an exemplary embodiment, component scores may be based assessed (or operational) data for the network adapters 420. Other embodiments may include, for example, basing the component scores on published data (e.g., prior test data) for the network adapter 420.

In an exemplary embodiment, the component scores are bit values. Possible bit values for determining component scores for the failover criterion are shown in parenthesis in FIG. 4. Table 1 includes still other exemplary bit values for various failover criteria. It is noted that the exemplary bit values for various failover criteria shown in Table 1 are merely intended to be illustrative, and are not limiting.

TABLE 1

Exemplary Bit Values for Determining Component Scores

| Failover Criteria | Bit Value |
|---|---|
| Receive-Heartbeat Failure | 0, 1 (1 bit) |
| Transmit-Heartbeat Failure | 0, 1 (1 bit) |
| Speed (Port Cost) | 0-7 (3 bits) |
| Active Path (OK/Failed) | 0, 1 (1 bit) |
| User Preference | 0-7 bits (3 bits) |
| HSRP | 0, 1 (1 bit) |
| VRRP | 0, 1 (1 bit) |

It is readily observed in Table 1 that some of the failover criteria are "Yes/No" or "Success/Failure" values and may be represented by a single binary number (or bit). Other failover criteria are represented by more complex values and are therefore represented using multiple bytes.

In an exemplary embodiment, a lower bit value indicates a "better" component score. For purposes of illustration, a network path may be assigned a status component score of "0" if it is connected and "1" if it is disconnected. A network path may be assigned an echo node component score of "0" if an echo heartbeat is received and "1" if no echo heartbeat is received. In FIG. 4, network adapter N1 is assigned a status component score 430a of "0" (i.e., it is connected) and echo node component score 431 of "0" (i.e., an echo heartbeat is being received). In contrast, network adapter N2 is assigned a status component score 430b of "1" (i.e., it is disconnected) and echo node component score 431b of "1" (i.e., no echo heartbeat is being received). Of course it is noted that in other embodiments, a higher bit value may indicate a "better" component score.

FIG. 4 also illustrates more complex values represented by multiple bytes. By way of example, a 1 Gbps link may have a path cost of 4 bits and a 100 Mbps link may have a path cost of 19 bits. However, path cost for a network adapter is determined based on all of the links in a network path. To illustrate, the network path for network adapter N1 in FIG. 4 includes three 1 Gbps links and therefore is assigned a path cost component score 432a of "12" (i.e., 3 links×4 bits=12). The network path for network adapter N3 in FIG. 4 includes two 1 Gbps links and one 100 Mbps link and is therefore assigned a path cost component score 432c of "27" (i.e., 2 links×4 bits+1 link×19 bits=27). It is noted these bit costs and link speeds are provided by way of example and are not intended to be limiting.

A ranking value 440 may be generated for each of the network adapters 420. In an exemplary embodiment, the ranking value 440 is a combination of the component scores for each of the failover criteria 410 for an individual network adapter. By way of example, the ranking value 445a for network adapter N1 is generated by ordering the status bit value 430a ("0"), the echo node bit value 431a ("0"), the path cost bit value 432a ("12"), the preferred bit value 433a ("1"), and the member ID bit value 434a ("3"), to arrive at "001213". The ranking values 445b and 445c for network adapters N2 and N3, respectively, are also shown in FIG. 4.

The ranking value 440 may be used to rank the network adapters 420 relative the other network adapters in the team. For purposes of illustration, network adapter N1 has the lowest ranking value 445a and is therefore ranked the highest (i.e., "1" or primary), network adapter N3 is ranked "2" or secondary, and network adapter N2 is ranked "3" or tertiary, as shown in cells 455a-c. Accordingly, network adapter N1 may be designated in a teaming environment as primary and network adapters N2 and N3 may be designated as tertiary and secondary adapters, respectively.

FIG. 5 is another high-level illustration of exemplary priority failover determination. It is noted that like references are used to refer to common elements in both FIGS. 4 and 5, with 400-series references used in FIG. 4 and 500-series references used in FIG. 5.

As discussed above with reference to FIG. 4, the failover criteria are prioritized at least in part by the user (e.g., using the GUI 600 in FIG. 6). FIG. 5 illustrates the ranking value and relative rank of each of the network adapters (N1-N3) if a user assigns a different priority to the failover criteria 510 in the same teaming environment of FIG. 4.

For purposes of the illustration in FIG. 5, the user has assigned the following priority for ranking network adapters: 1) status, 2) path cost, and 3) echo node. That is, path cost is now prioritized higher than echo node. As is readily apparent from matrix 500, the new priority causes the ranking values 540 to change even with everything else being constant. Although network adapter N1 still has the highest rank 555 corresponding to ranking value 545a of "012013", network adapter N2 ranks second with a ranking value 545b of "012111," and network adapter N3 ranks third with a ranking value 545c of "027022".

FIG. 6 is an exemplary user interface that may be implemented for priority failover determination. In an exemplary embodiment, the user interface is a graphical user interface 600 which enables the user to prioritize failover criteria for designating a primary and at least a secondary network adapter in a teaming environment.

Graphical user interface 600 may be implemented in a windows operating system environment (e.g., Microsoft Corporation's WINDOWS®), although the user interface is not limited to use with any particular operating system. The graphical user interface 600 is associated with a configuration application (e.g., application 340 in FIG. 3). The user may launch the graphical user interface 600 in a customary manner, for example, by clicking on an icon, selecting the program from a menu, or pressing a button on a keypad.

Graphical user interface 600 supports user interaction through common techniques, such as a pointing device (e.g., mouse, style), keystroke operations, or touch screen. By way of illustration, the user may make selections using a mouse (e.g., mouse 272 in FIG. 2) to position a graphical pointer and click on a label or button displayed in the graphical user interface 600. The user may also make selections by entering a letter for a menu label while holding the ALT key (e.g., "ALT+letter" operation) on a keyboard. In addition, the user may use a keyboard to enter command strings (e.g., in a command window).

Graphical user interface 600 is displayed for the user in a window, referred to as the "application window" 610, as is customary in a window environment. A title bar 620 may identify the application window 610 for the user. The application window 610 may include customary window functions, such as a Close Window button 615. Other customary window functions, such as, e.g., "OK" button 616, "CANCEL" button 617, and "HELP" button 618 may also be provided. A user may execute the configuration application using the graphical user interface 600 to provide user input for ranking network adapters, as described in more detail below.

Application window 610 may include an operation space 630. Operation space 630 may include one or more graphics for displaying output and/or facilitating input from the user. Graphics may include, but are not limited to, subordinate windows, dialog boxes, icons, text boxes, buttons, and check boxes. In FIG. 6, exemplary operation space 630 includes a plurality of subordinate windows which may be displayed by selecting tabs 631, 632, 633, 634, and 635.

In FIG. 6, tab 635 is shown selected to display the "Redundancy Controls" subordinate window 640, which may be implemented to receive user-prioritized ranking criteria and display network adapter assignments. Subordinate window 640 may include a "Current Primary Identity" display box 650 to identify the network adapter currently assigned as primary. Subordinate window 640 also includes "Redundancy Mechanism Settings" input box 660, "Redundancy Mechanism Priority" input box 670, "NIC Priority" input box 680, and "Primary Ranking and Redundancy Status" display box 690.

In an exemplary embodiment, a user may implement the "Redundancy Mechanism Settings" input box 660 to specify echo node test settings (e.g., ranking criteria) for one or more of the network adapters. For example, the user may identify a network adapter by selecting it in the VLAN ID box 661 and enable echo node heartbeats using checkbox 662. The Echo Node IP Address and Echo Node MAC address may be displayed in boxes 663a, 663b. If the IP and/or MAC addresses are not assigned or are assigned incorrectly, the user may enter the IP and/or MAC address assignments in boxes 663a, 663b. The user may also select test parameters at input boxes 664a, 664b, such as, e.g., by specifying echo node heartbeat transmission interval and/or echo node heartbeat timeout (e.g., in seconds). The user may also test the echo node by selecting the "Test Echo Node" button 665, e.g., to determine component scores for the echo node failover criterion.

A user may also implement the "Redundancy Mechanism Settings" input box 660 to adjust path cost or port cost settings (e.g., ranking criteria) for one or more of the network adapters. For example, the user may identify a network adapter by selecting it in the VLAN ID box 666 and select "Enable Path Cost Monitoring" or "Only Use Port Cost" using the appropriate radio button 667a, 668a. In FIG. 6, "Only Use Port Cost" is shown selected and accordingly the path cost settings 667b-c are shown "grayed out" (i.e., these settings are unavailable). Port cost settings allow the user to use the current adapter speed to determine port cost by selecting checkbox 668b, as shown in FIG. 6. Alternatively, the user may manually edit the port cost by selecting button 668c. The user may also test path cost by selecting the "Test Path Cost" button 669, e.g., to determine component scores for the path cost failover criterion.

A user may implement the "Redundancy Mechanism Priority" input box 670 to prioritize ranking criteria for the network adapters. For example, failover criteria are shown in display box 671 (e.g., echo node heartbeats, IRDP monitoring, and path cost monitoring). The user may click to highlight a failover criterion and move the selected failover criterion up or down relative the other failover criterion using up/down arrows 672.

A user may also implement the "NIC Priority" input box 680 to rank the network adapters (e.g., the preferred criterion in FIGS. 4 and 5). As discussed above, the user-preferred network adapters serve as a "tie-breaker" if one or more network adapters are otherwise ranked the same. The user may prioritize the network adapters shown in display box 681 (e.g., assigned to Slot 6, Slot 7, Slot 4, Slot 2, and Slot 1) by clicking on and highlighting the network adapter and then moving the network adapter up or down relative the other network adapters using up/down arrows 682.

"Primary Ranking and Redundancy Status" display box 690 may provide feedback for the user, enabling the user to view the network adapter rankings based at least in part on the user input in boxes 660, 670, and 680. For purposes of illustration, the network adapter in Slot 6 is shown designated as the primary network adapter, followed in order by the network adapters in Slot 4, Slot 1, Slot 2, and Slot 7. The network adapter in Slot 2 is ranked second lowest because the IRDP status is shown as failed. The network adapter in Slot 7 is ranked lowest because the echo node status is shown as failed. A refresh button 691 may be provided to enable the user to refresh the display box 690, e.g., after making changes to the ranking criteria.

It is noted that the exemplary embodiments discussed above are provided for purposes of illustration and are not intended to be limiting.

Exemplary Operations

Figure 7:
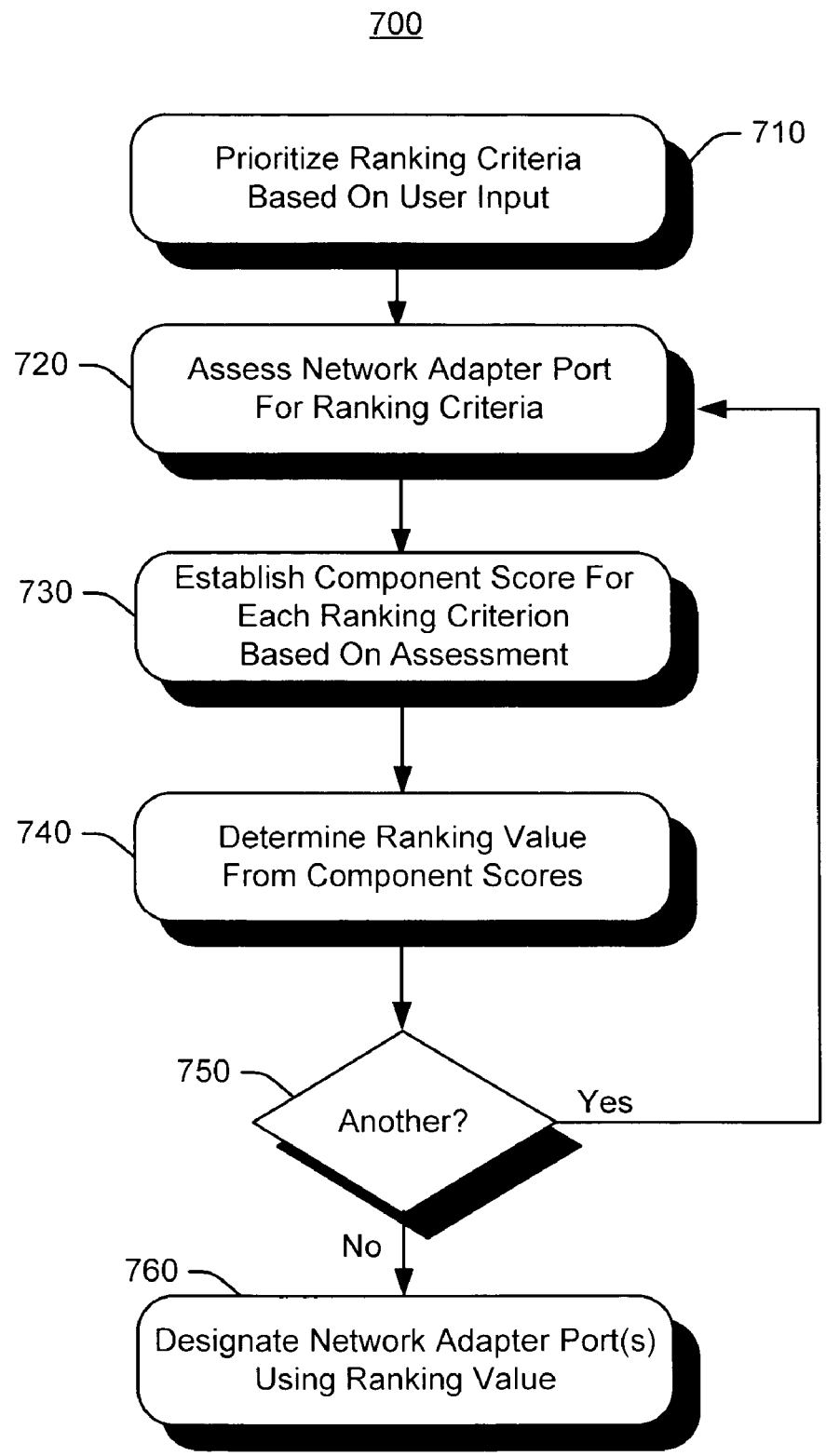
FIG. 7 is a flowchart of exemplary operations to implement priority failover determination.

FIG. 7 is a flowchart of exemplary operations to implement priority failover determination. Operations 700 may be embodied as logic instructions on one or more computer-readable medium. When executed on a processor, the logic instructions cause a general purpose computing device to be programmed as a special-purpose machine that implements the described operations. In an exemplary embodiment, the components and connections depicted in the figures may be used to implement priority failover determination.

In operation 710, ranking criteria for the network adapters (or NICs) are prioritized based at least in part on user input. It is noted that the ranking criteria may also be prioritized based on other factors in addition to user input. Other factor may include static factors (e.g., whether a network adapter is high cost or low cost) and/or dynamic factors (e.g., whether a network adapter is functioning properly).

In operation 720, a network adapter port in the team is assessed for the ranking criteria. For example, a network adapter port may be assessed for echo node, path cost, etc. In operation 730, a component score is established for each of the ranking criterion based on assessment of the network adapter port (e.g., in operation 720). Alternatively, prior assessments and/or published (or test) data may be used to establish a component score for the network adapter ports. In operation 740 a ranking value is determined for the network adapter port from the component scores. For example, a ranking value may be determined by combining component scores, as discussed above with reference to FIGS. 4 and 5.

In operation 750, a determination is made whether to assess another network adapter port in the team. If another network adapter port is to be assessed, operations return to operation 720 and follow through again to operation 750. If no other network adapter ports are to be assessed, network adapter port(s) is/are designated (e.g., as primary) in operation 760 based on the ranking value for the network adapter ports.

Other network adapters may also be designated in operation 760 based on the corresponding ranking value for each network adapter. For example, one or more network adapters in the team may be designated as secondary. Network adapters may also be designated as tertiary, quaternary, etc.

The operations shown and described herein are provided to illustrate exemplary embodiments of priority failover determination. It is noted that the operations are not limited to the ordering shown. For example, operation 750 may be implemented after operation 720 wherein each network adapter may be assessed before proceeding to operation 730. Still other orderings and other operations may be implemented to enable priority failover determination.

In addition to the specific embodiments explicitly set forth herein, other aspects will also be readily apparent to those skilled in the art from consideration of the specification disclosed herein. It is intended that the specification and drawings be considered as examples only, with a true scope and spirit of the following claims.

The invention claimed is:

1. A method of priority failover determination, comprising:
prioritizing ranking criteria for a plurality of network adapter ports based at least in part on user input;
establishing a component score for each of the ranking criteria to determine a ranking value for each of the network adapter ports;
determining the ranking value for each of the plurality of network adapter ports based on the prioritized ranking criteria; and
designating a primary network adapter port and at least a secondary network adapter port based on the ranking value for each of the plurality of network adapter ports.

2. The method of claim 1 further comprising assessing connectivity for each of the network adapter ports to determine the ranking value for each of the network adapter ports.

3. The method of claim 1 further comprising:
assessing connectivity for each of the network adapter ports; and
establishing a component score for each of the ranking criteria based on the assessed connectivity to determine the ranking value for each of the network adapter ports.

4. The method of claim 1 further comprising ordering a plurality of component scores for the prioritized ranking criteria to determine the ranking value for each of the network adapter ports.

5. The method of claim 1 further comprising ranking the plurality of network adapter ports relative one another to designate a primary network adapter port and at least a secondary network adapter port.

6. A system for priority failover determination in a teaming environment, comprising:
a computing device having a plurality of team members coupled to a computer network;
a user interface for prioritizing ranking criteria for the plurality of team members;
a controller operatively associated with the user interface and the plurality of team members, the controller including:
a computer readable media containing instructions for establishing component scores for the prioritized ranking criteria, wherein a ranking value is based on the component scores for each of the plurality of team members;
a computer readable media containing instructions for determining the ranking value for each of the plurality of team members based m the prioritized ranking criteria; and
a computer readable media containing instructions for designating a primary team member and at least a secondary team members based on the ranking value for each of the plurality of team members.

7. The system of claim 6 wherein the controller further includes a computer readable media containing instructions for ranking the plurality of team members relative one another.

8. The system of claim 6 wherein the ranking value is based on assessed connectivity of each of the plurality of team members.

9. The system of claim 6 wherein the ranking value for each of the plurality of team members is based on a combination component scores for the prioritized ranking criteria.

10. The system of claim 6 wherein the ranking value for individual team members is an ordered combination of component scores.

11. The system of claim 10 wherein the component scores are assigned bit values.

12. The system of claim 10 wherein the component scores are assigned multiple bit values.

13. The system of claim 10 wherein the component scores are assigned based on assessed characteristics of the individual team members.

14. The system of claim 6 wherein the ranking value is based at least in part on a user-preferred ranking of the team members relative one another.

15. The system of claim 6 where the ranking value is based at least in part on a Member ID unique to each of the team members.

16. A system for priority failover determination, comprising: user input means for prioritizing ranking criteria for a plurality of network paths in a teaming environment; means for assigning a ranking value to each of the plurality of network paths based at least in part on the prioritized ranking criteria; means for assessing connectivity of each network path wherein the ranking value is based at least in part on assessed connectivity; path-selection means for selecting a network path based on the ranking value for each of the plurality of network paths; and means for combining component scores determined for each network path, wherein the ranking value is based at least in part on the combined component score.

* * * * *

UNITED STATES PATENT AND TRADEMARK OFFICE
CERTIFICATE OF CORRECTION

PATENT NO. : 7,460,470 B2
APPLICATION NO. : 11/084600
DATED : December 2, 2008
INVENTOR(S) : Michael Sean McGee et al.

It is certified that error appears in the above-identified patent and that said Letters Patent is hereby corrected as shown below:

On the face page, in field (57), under "Abstract", in column 2, line 1, delete "or" and insert -- for --, therefor.

On the face page, in field (57), under "Abstract", in column 2, line 3, after "for" insert -- a --, therefor.

In column 2, line 53, delete "125-a-c" and insert -- 125a-c --, therefor.

In column 10, line 28, delete "factor" and insert -- factors --, therefor.

In column 12, line 3, in Claim 6, after "based" delete "m" and insert -- on --, therefor.

In column 12, line 7, in Claim 6, delete "members" and insert -- member --, therefor.

In column 12, line 32, in Claim 15, delete "where" and insert -- wherein --, therefor.

In column 12, line 41, in Claim 16, delete "path" and insert -- path, --, therefor.

Signed and Sealed this

Nineteenth Day of May, 2009

JOHN DOLL
*Acting Director of the United States Patent and Trademark Office*